United States Patent [19]

Sakamoto et al.

[11] Patent Number: 4,716,291
[45] Date of Patent: Dec. 29, 1987

[54] COPYING MACHINE

[75] Inventors: Hiroshi Sakamoto, Fukuoka; Toshihiro Torigoe, Kasuya; Tadashi Yamaguchi, Fukuoka, all of Japan

[73] Assignee: Matsushita Electric Industrial Co., Ltd., Osaka, Japan

[21] Appl. No.: 733,806

[22] Filed: May 14, 1985

[30] Foreign Application Priority Data

May 16, 1984 [JP] Japan .................................. 59-97984
May 16, 1984 [JP] Japan .................................. 59-97983
Jan. 18, 1985 [JP] Japan .................................. 60-6960

[51] Int. Cl.⁴ .............................................. G03C 5/16
[52] U.S. Cl. .............................. 250/318; 250/317.1; 346/76 PH; 358/286
[58] Field of Search ................. 250/317.1, 918, 319; 346/76 PH, 143; 358/286

[56] References Cited

U.S. PATENT DOCUMENTS

| | | | |
|---|---|---|---|
| 3,064,077 | 11/1962 | Cary | 358/286 |
| 3,840,701 | 10/1974 | Tomii et al. | 178/7.2 |
| 3,976,973 | 8/1976 | Martin et al. | 340/146.3 F |
| 4,061,380 | 12/1977 | Carnahan et al. | 339/8 R |
| 4,142,214 | 2/1979 | Yamazaki et al. | 358/257 |
| 4,264,396 | 4/1981 | Stewart | 346/76 PH |
| 4,317,137 | 2/1982 | Tompkins | 358/286 |
| 4,319,283 | 3/1982 | Ozawa et al. | 358/286 |
| 4,421,406 | 12/1983 | Feinleib | 355/84 |
| 4,472,710 | 9/1984 | Suzuki et al. | 340/707 |
| 4,523,235 | 6/1985 | Rajchman | 346/76 PH |
| 4,574,317 | 3/1986 | Scheible | 358/286 |

OTHER PUBLICATIONS

IBM Technical Disclosure Bulletin, vol. 19, No. 1, Jun. 1976, Uberbacher "Read/Write Stylus", Dept. 177.
Copy-Jack 40, "Hand Copy Machine", Plus Corporation, 20-11 Otowa 1-chome, Bunkyo-ku, Tokyo 112, Japan, copyright 1986.

Primary Examiner—Bruce C. Anderson
Attorney, Agent, or Firm—Wenderoth, Lind & Ponack

[57] ABSTRACT

A portable copying machine has a thermal head printer for printing image information on a copy paper, a Charge Coupled Device for reading out the image information, and a time-limit device of which setting time is varied in response to the voltage of power source, whereby a copying shade of the copy paper is kept constant, even if the voltage of a power source is changed by controlling the strobe pulse of the thermal head printer by the time-limit device.

20 Claims, 45 Drawing Figures

23

24  23

23  24

Fig. 38
Fig. 39
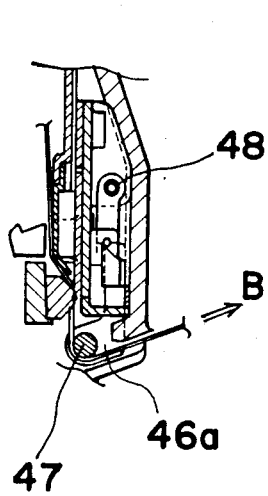
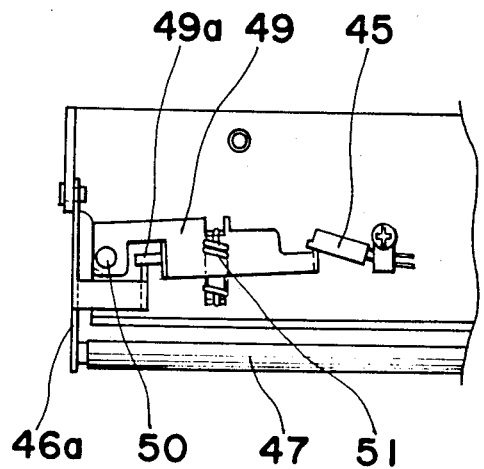
Fig. 40
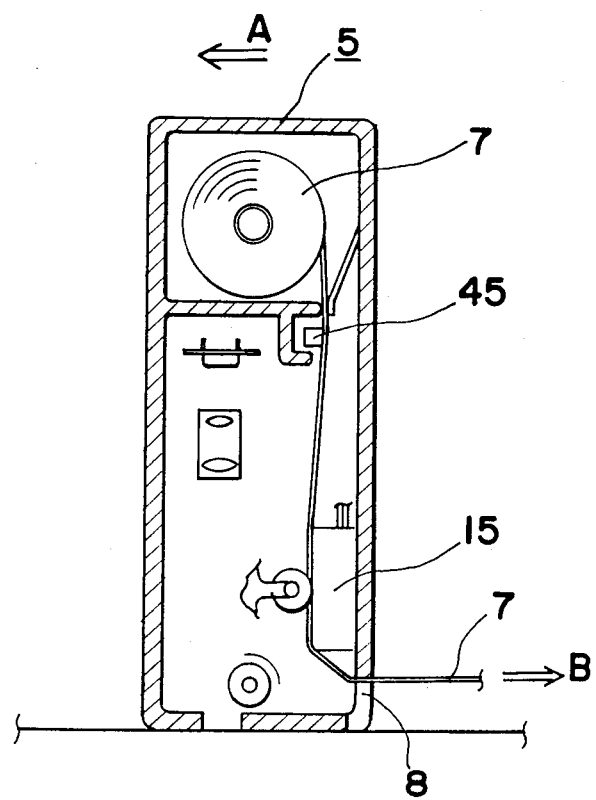

COPYING MACHINE

This application is related to copending application, Ser. No. 706,886, which was filed on Mar. 1, 1985.

BACKGROUND OF THE INVENTION

1. Field of the Invention

The present invention relates to a copying machine for printing data read by a one-dimensional image sensor on a thermosensitive sheet with a thermal printer.

2. Description of the Prior Art

Copying machines in most widespread use today employ the Carlson process for copying image data on plane paper. The electrophotographic copying machines of this type require a high-voltage power supply for charging a photosensitive drum. It would be difficult to produce a portable electrophotographic machine because of a high power consumption rate necessitated by a heater for fixing toner images. The copying machines which operate based on the Carlson process must be maintained or serviced periodically by supplying toner and cleaning the photosensitive drum, for example. Since these copying machines are generally heavy and large in size, they are incapable of copying characters written on a wall, for example. The copying machines require various components such as the photosensitive drum, a charger for charging the photosensitive drum, a driver unit for driving the photosensitive drum, and a driver unit for feeding sheets of copying paper, for example. Inasmuch as these parts are expensive in general, the electrophotographic copying machines are costly to manufacture and hence are inappropriate for personal use. Therefore, the inventors have tried to exploit a new copying machine which is operated by a small type of dry battery and is provided with a Charge Coupled Device of first dimension (hereinafter referred to CCD (The construction and operation of the CCD is disclosed in detail within the technical report of pages 108 to 111 issued in December 1974 at the International Electron Device Meeting of IEEE in the U.S.A.)) and a thermal printing head. By the way, it is to be noted that, in the case of operating the CCD and thermal head printer at the same time for making a copy, it is necessary to transport image information having a length of one line from the CCD while the thermal head printer is adapted to copy the one line onto the sheet of thermally sensitive copy paper. In other words, it is necessary to sense one line content of image information to be read by the CCD by every one dots at the same time for an interval of removing pulse signals from the head strobe to the final strobe within the thermal head printer. Also, it is to be noted that the thermal head printer is adapted to receive an effect on the printing quality of the copying machine by factors such as power source voltage, printing time (i.e., width of strobe pulse), reserving heat of the thermal head printer. In general, it is desired to adjust either the power source voltage or the strobe for keeping the printing quality constant, but, in the case of a small copying machine to be operated by a dry battery, it is desired to control the strobe pulse width in order to obtain good efficiency, and a time for the one line printing in the thermal head printer is changed by the power source voltage or reserving heat of the thermal head printer. If the power source voltage is changed, the voltage loaded on the printer is varied to change the shade of print, thereby to render to make the printing quality worse.

SUMMARY OF THE INVENTION

This invention has been developed for the purpose of obviating all the aforesaid disadvantages of the prior art.

It is an object of the present invention to provide a copying machine suitable for personal use, which is so small in size and lightweight as to be easily held by hand and has such a small power requirement as to be battery-operated.

It is another object of the present invention to provide a copying machine which is able to make a check for securing the remaining amount of the copy paper in a simple manner.

It is a further object of the present invention to provide a copying machine which is effective to make the variation of printing quality small even if the power source voltage is changed.

It is still a further object of the present invention to provide a copying machine which is able to feed the copy paper smoothly.

It is yet another object of the present invention to provide a copying machine which is able to operate by a small force.

According to the present invention, there is provided a copying machine which has an image sensor and a thermal printer for printing image information or visible data on copy paper. The copying machine is moved over an original document to read the visible data with the image sensor, and the visible data read by the image sensor is printed by the thermal print head on the copy paper. The reading of the visible data with the image sensor is synchronized with the printing of the visible data onto the copy paper with the thermal print head by fixing an end of the copy paper discharged from the copying machine and moving the copying machine with respect to the original document. In the preferred embodiment of the present invention the copying machine comprises an image sensor of train type having a plurality of sensing cells arranged in a line for detecting the image information of a manuscript to be copied, a print means of train type having a plurality of printing cells arranged in a line for printing onto a copy paper in accordance with an output of the image sensor, an electric power source for supplying electric power to the image sensor and print means, a housing for accommodating therein the image sensor, print means and copy paper, an opening for drawing out the copy paper outwardly from the housing which is adapted at a portion of or a portion close to the housing to contact with the manuscript, whereby the image information of the manuscript is copied onto the copy paper by moving the housing against the manuscript and copy paper.

BRIEF DESCRIPTION OF THE DRAWINGS

These and other objects and features of the present invention will become more apparent from the following detailed description taken in conjunction with the preferred embodiments thereof with reference to the accompanying drawings, in which:

FIGS. 35, 37 and 39 are respectively cross-sectional views, on an enlarged scale, showing paper sensors to be employed in the copying machine of FIG. 1;

FIGS. 36 and 38 are respectively enlarged back side views of the paper sensors of FIGS. 35 and 39;

FIG. 40 is a cross-sectional view, showing a copying machine in accordance with an eleventh embodiment of the present invention;

DETAILED DESCRIPTION OF THE INVENTION

Figure 1:
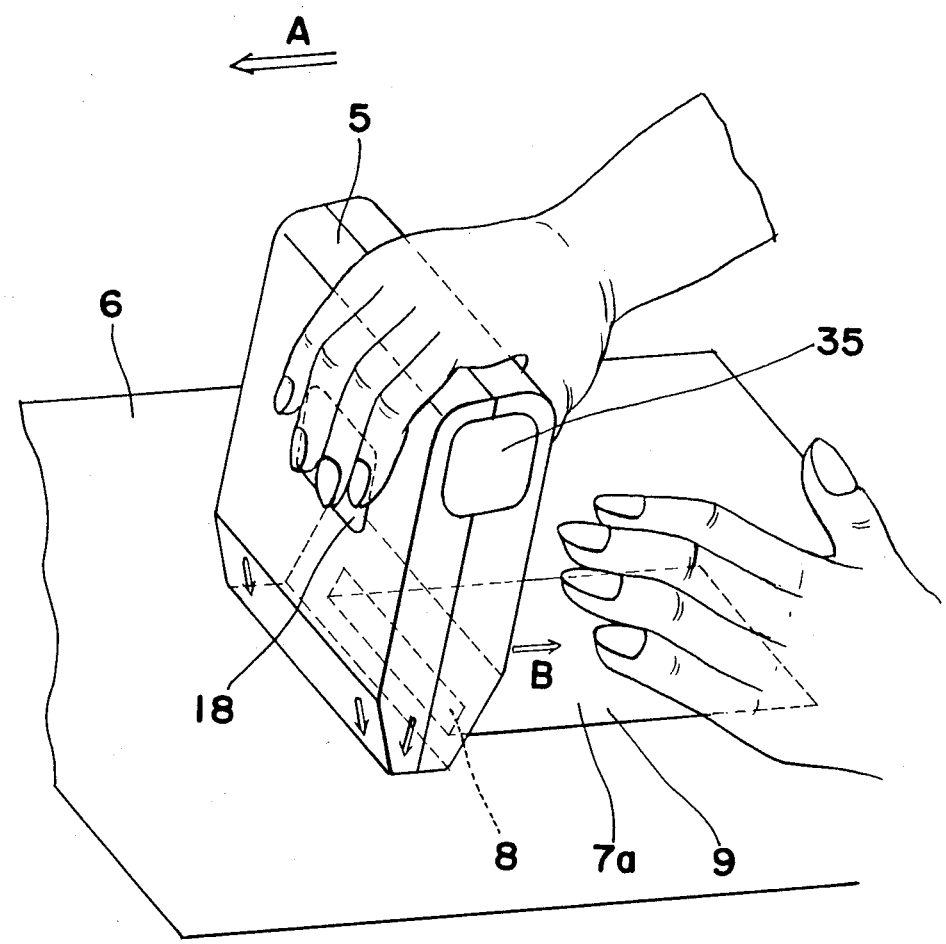
FIG. 1 is a schematic perspective view showing a copying machine in accordance with a first embodiment of the present invention.

Before the description of the present invention proceeds, it is to be noted that like parts are designated by like reference numerals throughout the several views of the accompanying drawings.

Initially, the using process and construction of a portable digital copying machine (hereinafter referred to as a copying machine) are explained in detail with reference to the drawings, FIG. 1 showing the operational state of the copying machine and FIGS. 2 to 42 showing various constructions of the copying machine, respectively.

Referring to FIG. 1, a roll of copy paper 7 for copying a manuscript 6 is accommodated within a housing 10 of the copying machine 5, the starting end 7a of copy paper 7 being adapted to be drawn out of an opening means or exit 8 provided at the lower end of the copying machine 5 to the outside of the copying machine. The exit 8 comprises a paper guiding means for guiding the copy paper in contact with a print means and then out of the housing in overlapping relationship with the manuscript 6 to be copied during a copying operation, the exit 8 being provided in a portion of the housing which confronts the manuscript during the copying operation, whereby the copy paper can be withdrawn from the housing by fixing a portion of the copy paper in contact with the manuscript with one hand of a user of the copying machine and the housing can be moved relative to the manuscript with the other hand of the user to thereby apply image information to the copy paper with the print means as the copy paper is withdrawn from the housing. The process of using the copying machine for obtaining a copy of the manuscript 6 on the copy paper 7 comprises steps of placing the copying machine 5 on the manuscript 6 to be copied, pressing the starting end 7a of the copy paper 7 onto the manuscript 6 with one hand of an operator to secure the relationship therebetween, holding the copying machine 5 by the other hand of the operator with connecting to a power source, and moving the copying machine 5 in parallel to the direction of an arrow A while pressing the copy paper 7 onto the manuscript 6, thereby to render to obtain a copy of the manuscript on the copy paper which is being drawn in the direction of an arrow B from the copying machine to the outside. After completion of the above steps of using the copying machine, the contents of the manuscript 6 are copied onto the copying surface of the copy paper 7 after a length thereof just corresponding to the distance that the copying machine is moved in the direction A. Accordingly, the copying machine of the present invention is adapted to be operated in accordance with the above steps.

Figure 2:
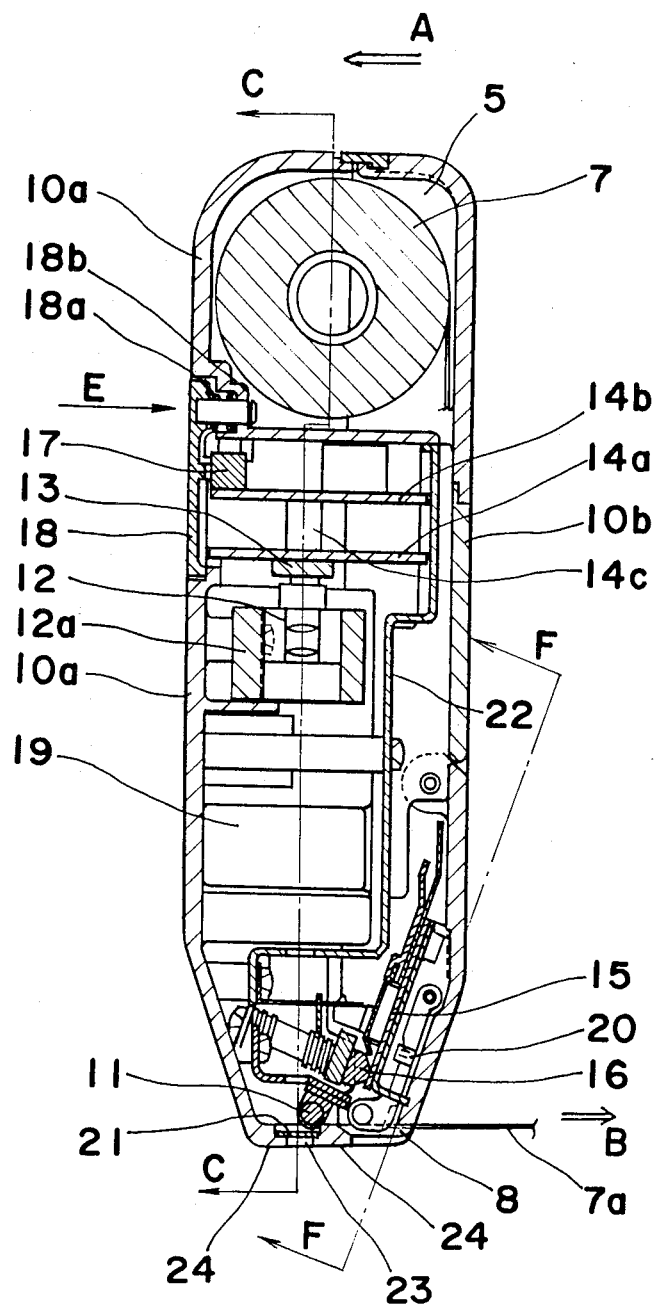
FIG. 2 is a cross-sectional view, taken from the side elevation, of the copying machine of FIG. 1.
Figure 3:
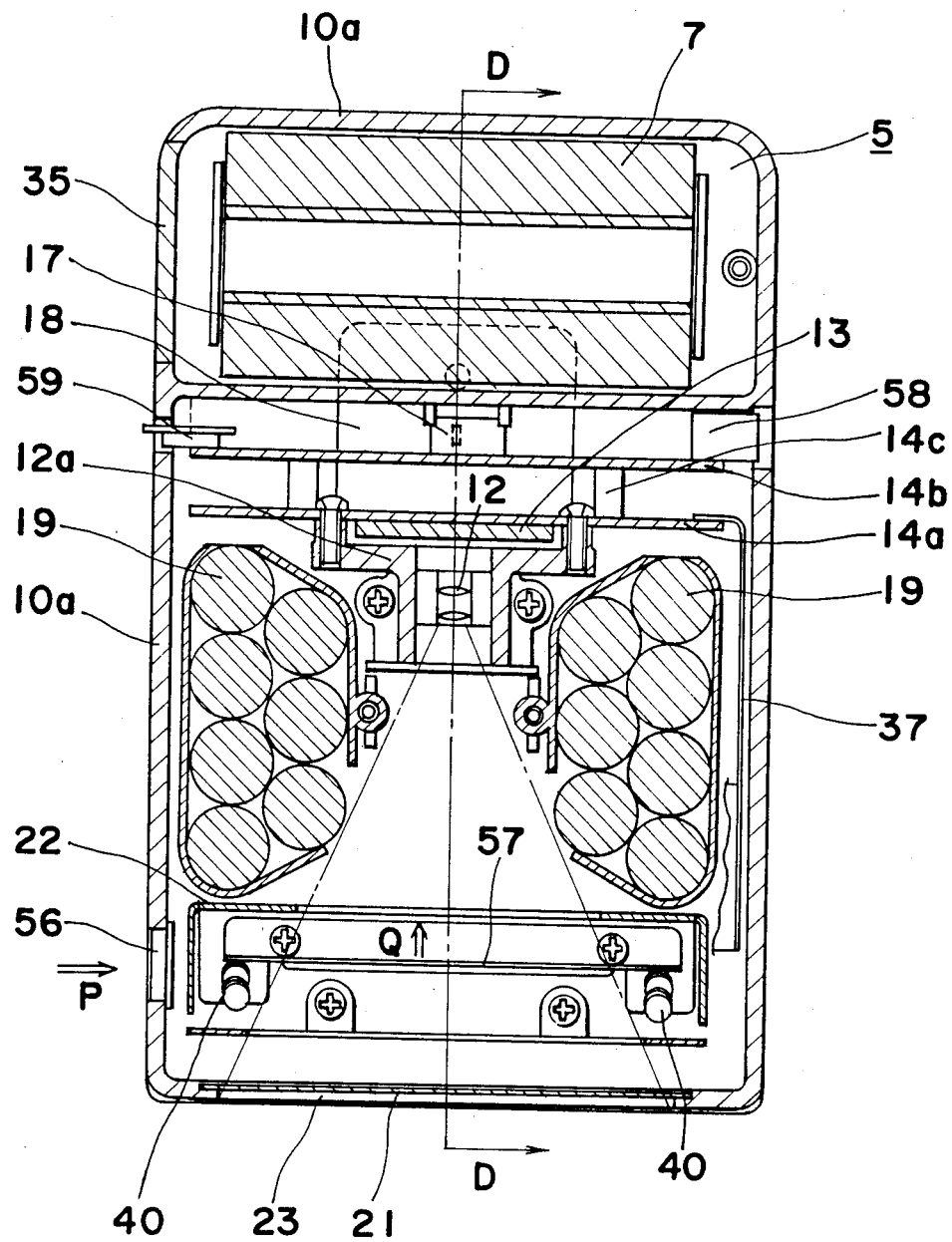
FIG. 3 is a cross-sectional view, taken from the front elevation, of the copying machine of FIG. 1.
Figure 4:
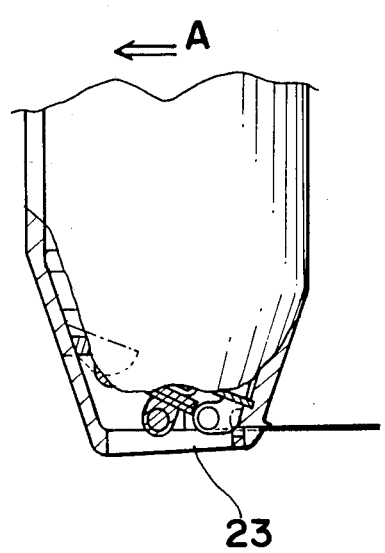
FIG. 4 is a side elevational view, partially broken away, showing a portion of a copying machine in accordance with a second embodiment of the present invention.

As to the construction of the copying machine, FIG. 2 shows a cross-sectional view of the copying machine taken from the right side along a line D—D of FIG. 3, while FIG. 3 shows a cross-sectional view of the copying machine taken from the front plane along a line C—C of FIG. 2. Referring to FIGS. 2 and 3, the housing 10 of the copying machine 5 is formed with a pair of half cases 10a and 10b made of resin and coupled to each other. Within the housing 10, there are provided components, which are necessary to read out the contents of the manuscript 6, including a light 11, lens 12, CCD 13 and printed circuit boards 14a and 14b, each provided with a binary circuit thereon, and components, which are necessary to copy onto the copy paper, including the roll of copy paper 7, a thermal head printing means such as a printer 15 of line type and platen 16. In addition, the copying machine 5 accommodates therein a power source switch 17 constituted by a micro-switch, button 18 for turning the power source switch 17 on or off, storage battery 19, paper sensor 20 for detecting the movement of the copy paper 7, transparent plate 21 constituted by a transparent glass plate and paper guide 22 for guiding the movement of the copy paper.

The construction of the read-out components for the manuscript 6 will be explained in detail hereinafter. In the bottom portion of the housing 10, there is provided a reading slit or hole 23 extending there-through to the outside so as to be able to read-out the contents of the manuscript 6, and the transparent plate 21 for preventing dust from entering the housing is provided at the upper portion of the hole 23. Also, above and to one side of the hole 23, there is provided the light 11 for illuminating the manuscript through the hole 23, the light 11 comprising a plurality of light emitting diodes (hereinafter referred to as LED) each arranged with the others in a straight line and which are turned on by pressing the operational button 18 in the direction of an arrow E to shine light on the manuscript. The reflected light from the manuscript 6 shed by the light 11 is focused onto the CCD 13 through the lens 12. Since distances among the manuscript, lens and CCD are set to be identical to a distance connected with the respective focusing points of them, the reflecting light of the manuscript 6 is adapted to made an image formation onto the CCD 13. The data focused onto and read out by the CCD 13 is changed to a binary code and is transferred in sequence to the thermal head printer 15.

As to the above components, the lens 12 is held by a lens holder 12a, and the printed circuit board 14 is formed with the pair of printed circuit boards 14a and 14b connected to each other via a spacer 14c. The CCD 13 is mounted on the printed circuit board 14a, which in turn is fixed to the lens holder 12a, and the lens holder 12a is secured on the case 10a. The power source switch 17 is mounted on the printed circuit board 14b and, at the same time, is held by the case 10a. Also, the power source switch 17 is so positioned to oppose against the operational button 18 such that the power source switch 17 is turned on by pressing the operational button 18 toward the direction E. The operation button 18 is provided with an operational button spring 18a which urges the operational button 18 toward a direction opposite to the direction E. Also, there is provided a mounting 18b for securing the operational button 18 at a given position.

As to the configuration of the bottom plane of the copying machine 5, if the hole 23 is provided throughout the whole area of the bottom plane, it is difficult to press the manuscript 6 by the bottom plane, resulting in that it frequently happens to generate a wrinkle on the manuscript 6 or to form a waveform of the manuscript 6. If the wrinkle or wave is once generated on the manuscript 6, the luminous intensity on the plane of the manuscript 6 varies from a high grade to a lower grade at different points thereof, and the reflected light is dispersed to focus onto the CCD 13 such that unevenness of the luminous intensity occurs, whereby the data having been read out by the CCD 13 lacks uniformity resulting in difficulty in changing the data into binary code.

To eliminate such defects, in the copying machine of the present invention, within the bottom plane of the housing 10 there is provided a pair of planes or flat surfaces 24, 24 around the forward and rearward ends or opposite sides of the hole 23 along the moving direction of the copying machine so that the planes 24 are adapted to press the manuscript 6 to prevent generation of wrinkles or waveforms on the manuscript 6.

Figure 5:
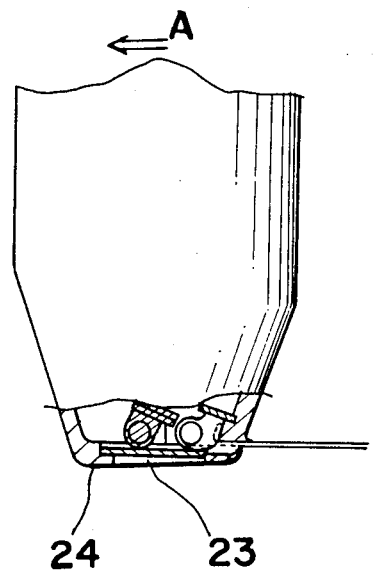
FIG. 5 is a similar view of FIG. 4, showing a copying machine in accordance with a third embodiment of the present invention.
Figure 6:
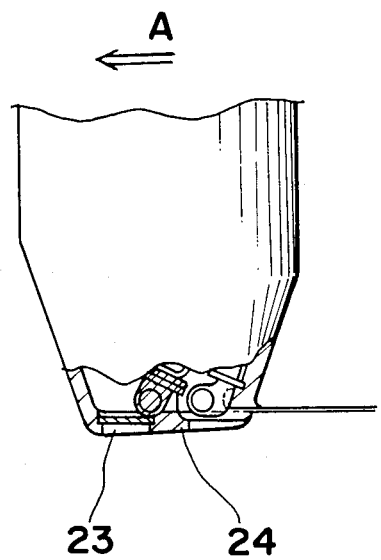
FIG. 6 is a similar view of FIG. 4, showing the copying machine of FIG. 1.

FIG. 2 shows an embodiment provided with a pair of planes 24, 24 along the forward and rearward end of the hole 23, but FIG. 5 shows another embodiment provided with only one plane or flat surface 24 at the forward end of the hole 23, thereby to obtain an effect similar to but slightly inferior to the embodiment of FIG. 2. Also, only one plane 24 can be provided at the rearward end of the hole 23, as shown in the other embodiment of FIG. 6, in order to obtain the same effect as in the embodiment of FIG. 2.

Figures 7, 8, 9:
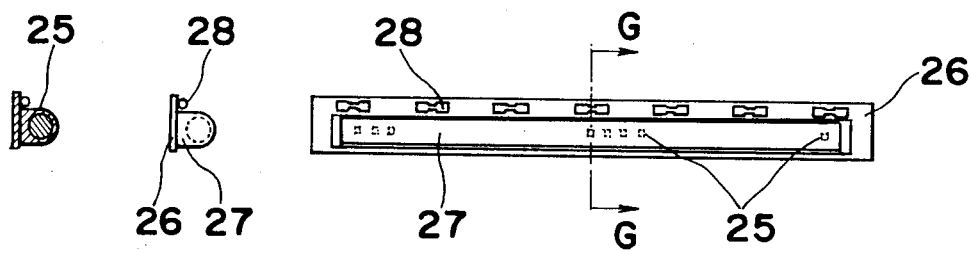
FIG. 7 is a cross-sectional view of a light source to be employed in the copying machine of the present invention.
FIG. 8 is a side elevational view of the light source of FIG. 7.
FIG. 9 is a front view of the light source of FIG. 7.
Figure 10:
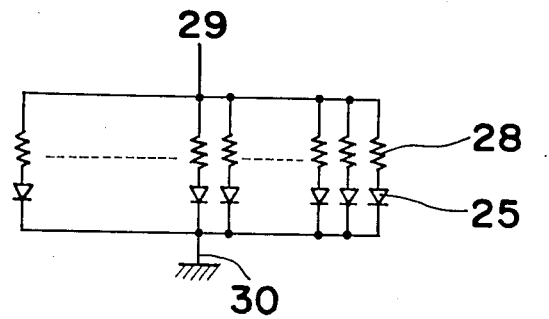
FIG. 10 is an electric circuit diagram of the light source of FIG. 7.

Both of the characteristics about the light 11 and lens 12 will be explained hereinafter in connection with the embodiments of FIGS. 7 to 9, which are a cross-sectional view, a side elevational view and a front elevational view of the light 11, respectively. In FIGS. 7 to 9, the light 11 comprises a plurality of spot light sources 25 provided in a line at equal intervals and a plurality of LEDs mounted by bonding on an LED base plate 26. Also, on the LED base plate 26, there is provided a reflecting plate 27 formed by synthetic resin to concentrate the light from the spot light sources 25, and resistors 28 for restricting electric current to be supplied to the spot light sources 27. FIG. 10 shows an electric circuit of the light 11 in one embodiment of the present invention, which comprises the spot light sources 25, resistors 28, a positive power source 29 and a negative power source 30.

Figure 11:
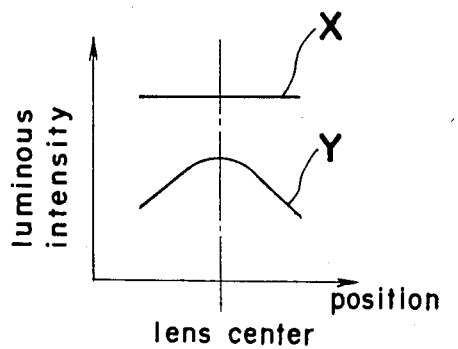
FIG. 11 is a graph showing a radiation-intensity characteristic on the employment of a lens and a conventional light source.
Figure 12:
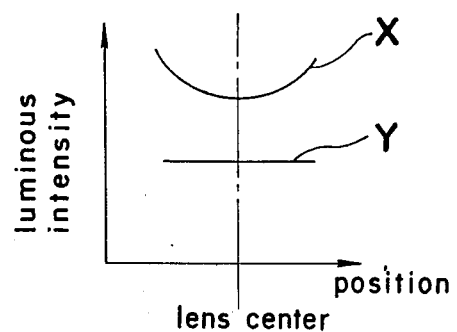
FIG. 12 is a similar graph of FIG. 11, on the employment of a lens and the light source of the present invention.

Apart from the embodiments of the present invention, FIG. 11 shows light quantity characteristics with the employment of a conventional light and lens, in which the abscissa shows a position of the light in a longitudinal direction thereof, and the ordinate represents a luminous intensity of the light. In FIG. 11, a line X is a luminous intensity of the surface of the manuscript 6, while a curve Y is a luminous intensity on the light receiving plane of the CCD 13. The line X shows a fact that the quantity of light supplied to the manuscript is uniform, and a curve Y, which is the quantity of light to be obtained by the CCD 13 after passing through the lens 12, i.e., the quantity of light passing through the lens 12 by itself, shows the additional fact that there is a difference between the light quantities to be obtained at the center portion and peripheral portion of the lens, these facts being referred to as a COS four multiplicative rule in usual means. However, it is to be noted in fact that the above conventional one cannot obtain a good result for producing binary signal. On the other hand, FIG. 12 shows a light quantity characteristic obtained by the embodiments of FIGS. 7 to 9, in which a curve X is a luminous intensity on the surface of the manuscript 6, and a line Y is a luminous intensity on the light receiving plane of the CCD 13. As shown with the curve X, the luminous intensity of the light is designed such that the peripheral portion of the light is brighter than the axial, central portion thereof in order to correct and compensate for the characteristics of the quantity of light passed through the lens 12. With the employment of the light 11 and lens 12 as shown in FIGS. 7 to 9, the luminous intensity to be obtained on the light receiving plane of the CCD 13 after passing through the lens 12 becomes uniform upon making the correction in mutual relationship between the characteristics of the light 11 and lens 12, whereby a good result can be obtained for reading out the contents of manuscript 6 in comparison with that of the conventional one.

Figure 13:
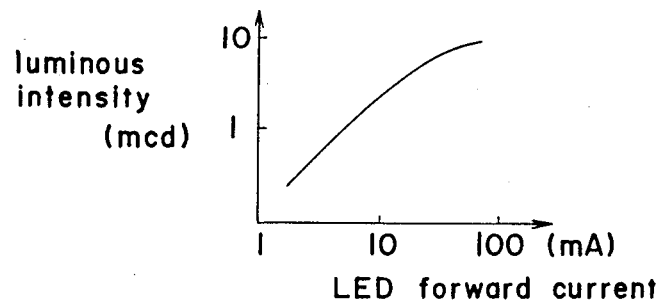
FIG. 13 is a graph showing a characteristic relating to the luminous intensity and forward current of a conventional light emitting diode.

For obtaining the uniformity of the luminous intensity on the light receiving plane of the CCD 13, the light is constituted by an electric circuit as shown in FIG. 10, provided with a plurality of spot light sources 25 of LEDs, resistors 28, a positive power source 29, and a negative power source 30. FIG. 13 shows a relationship between an electric current to be supplied into the LEDs and the luminous intensity of radiation thereof, the value of the latter being varied in accordance with the amount of the former. In other words, the radiating luminous intensity of the spot light source 25 can vary by changing the value of the resistors 28 of FIG. 10, resulting in that the light distribution as shown with the curve X of FIG. 12 can be obtained.

Figure 14:
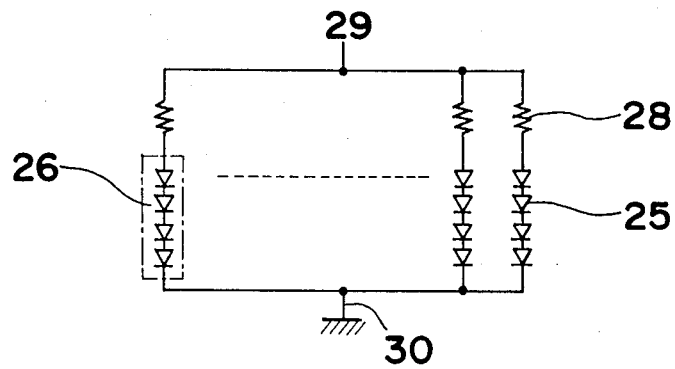
FIG. 14 is a similar view of FIG. 7, showing a modification of the present invention.

Accordingly, in the embodiments of FIGS. 7 to 9, the uniform luminous intensity can be obtained on the light receiving surface of the CCD 13 with the employment of the spot light sources arranged in a line at equal intervals, and only one electric power source is enough to supply electric current to the electric circuit of the spot light sources. In addition, in the electric circuit of FIG. 10, one resistor is provided to correspond to one LED, but another arrangement can be made as shown in FIG. 14, wherein a plurality of LEDs are connected in series to form one block 26 which is connected with one resistor, and the electric power source is so designed that the electric current to be supplied to each one of the LED blocks 26 can be varied, thereby to render to reduce the electric current for driving the electric circuit while obtaining the same effect as that of the electric circuit of FIG. 10.

Figure 15:
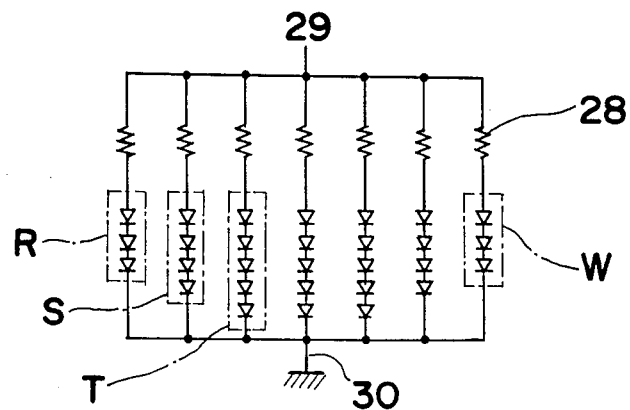
FIG. 15 is a similar view of FIG. 7, showing another modification of the present invention.

Also, FIG. 15 shows the other arrangement, wherein a number of the LEDs connected in series at equal intervals to form one block are changed by every block R, S, T, . . . , W to be disposed at respective positions adjacent to the light axis and the peripheral portion, for instance, an arrangement of blocks having a sequence of numeral series such as 3, 4, 5, 5, - - - , 5, 4, 3, and the values of the electric currents to be supplied to each one of the blocks are varied by changing the values of respective resistors 28, whereby the reduction of the light quantity at the periphery of the optical system can be corrected. With this arrangement, since the reduction rate of the light quantity becomes large in an area to be disposed around the periphery of the lens 12, the number of LEDs connected in series within one block disposed around the periphery of the lens 12 is less than that of the other block disposed adjacent to the light axis thereof, whereby the correction of the light quantity can respond precisely to the reduction rate of the light quantity.

Figure 16:
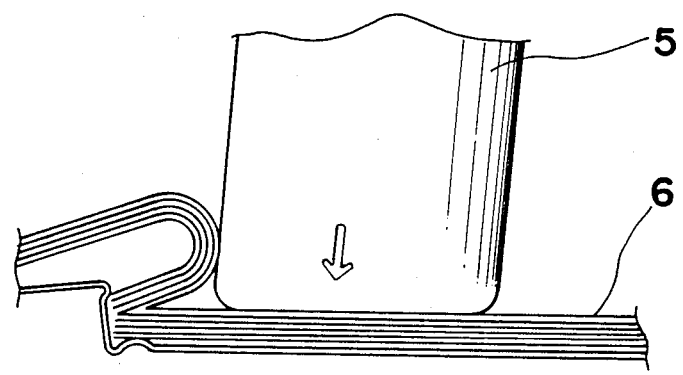
FIG. 16 is a partial cross-sectional view, showing the copying machine in use in accordance with a fourth embodiment of the present invention.

The external shape of the housing in the copying machine 5 will be explained hereinafter in connection with FIGS. 1, 2 and 16. In the case of making a copy of the manuscript 6 by pressing the copying machine onto the manuscript, it is useful and practical to provide a more narrow bottom plane of the copying machine. This is because, if the bottom plane of the copying machine to be pressed onto the manuscript 6 is formed too wide as shown in FIG. 16, in the case of copying such a manuscript having a thickness such as a book or a magazine, the side plane of the copying machine may be obstructed by the cental bending portion of the book to be copied, thereby reducing the available copying area of the book to be copied. Also, when the bottom plane of the copying machine is constructed with a large dimension, it is difficult for the operator to fit the hole 23 of the copying machine onto a portion of the manuscript which is desired to be copied. Since it is difficult for the operator to recognize from the outside the position of the hole 23 provided on the bottom of the copying machine, i.e., the position for reading out the manuscript, in order to manually press the hole of the copying machine onto the position to start a copy of the manuscript, it is necessary for the operator to have a custom skill for pressing the copying machine in some extent, and, if the copying machine is not pressed at the right position, it happens to make trouble such that a portion of the manuscript necessary to be copied is not copied or a portion of the manuscript unnecessary to be copied is copied. For eliminating such inconvenience for pressing the copying machine, in the embodiment of the present invention, the housing 10 of the copying machine is constructed with a bottom plane or surface having a width narrower than that of an upper portion of the housing or the upper plane thereof, as shown in FIGS. 1 and 2.

Figure 17:
FIG. 17 is a right side elevational view of the copying machine of FIG. 1.
Figure 18:
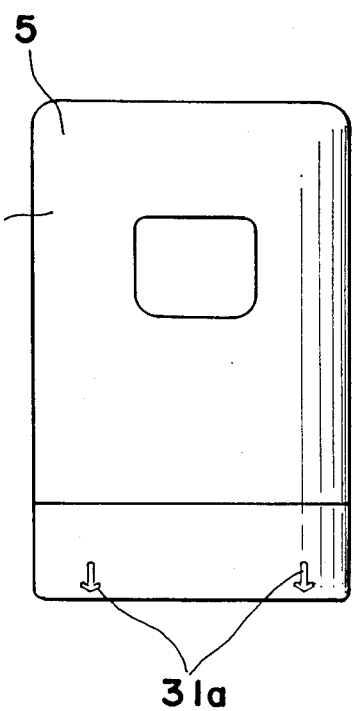
FIG. 18 is a front view of the copying machine of FIG. 1.
Figure 19:
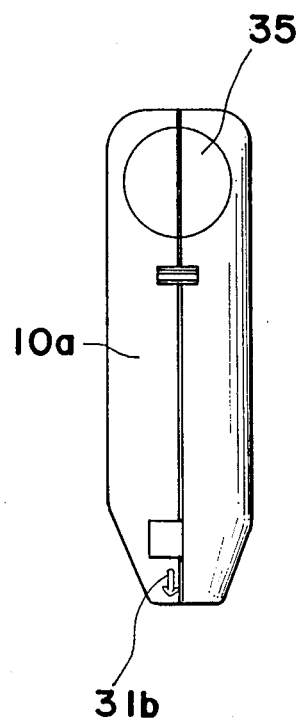
FIG. 19 is a left side elevational view of the copying machine of FIG. 1.

In addition thereto, in order to facilitate the pressing of the hole 23 of the copying machine onto the right portion of the manuscript 6 desired to be copied, there are provided two kinds of marks 31a and 31b on the outer surface of the housing 10 of the copying machine 5, one mark 31a indicating the range of area for reading out the manuscript, while the other mark 31b is a mark indicating the side position close to the reading-out portion of the manuscript 6, as shown in FIGS. 17 to 19. With these marks, it is easy for the operator to recognize, from the outside of the copying machine 5, the right position of the hole 23 provided on the bottom plane of the copying machine, i.e., factors including the range of the reading-out portion of the manuscript and the side position close to the reading-out portion of the manuscript, whereby the operator can easily perform and control the pressing operation of the hole of the copying machine onto a portion of the manuscript desired to be copied.

Figure 20:
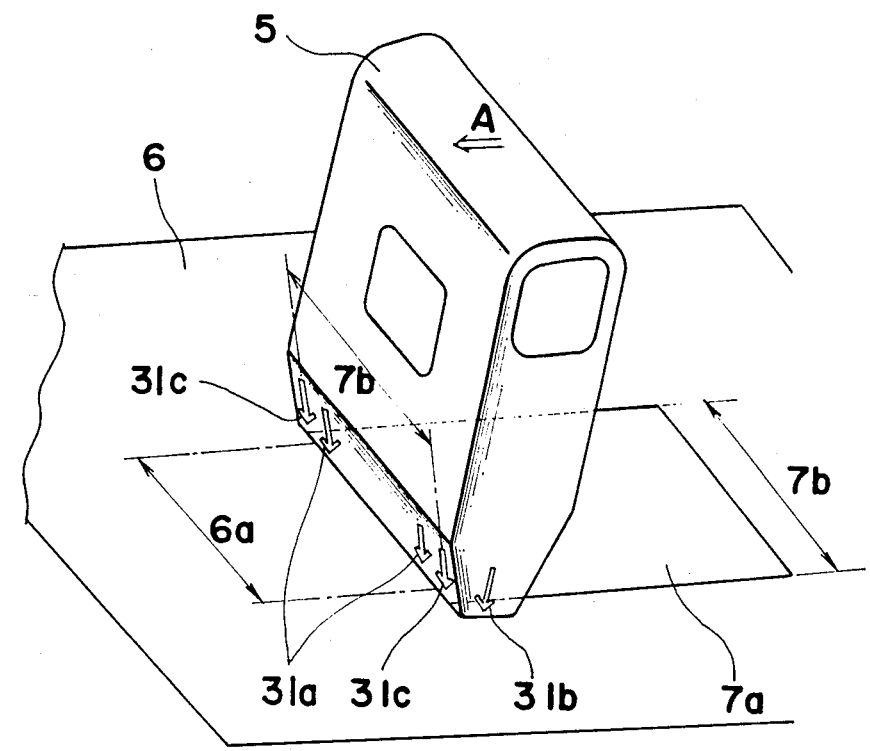
FIG. 20 is a perspective view, showing the copying machine of FIG. 1 in use.
Figure 21:
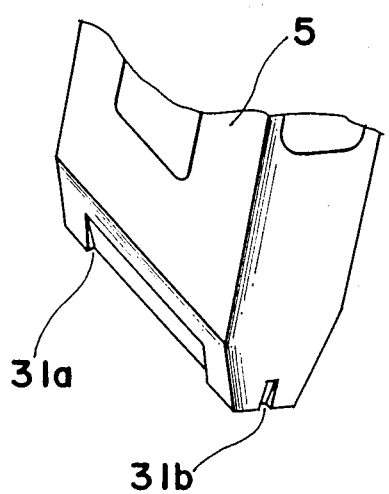
FIG. 21 is a perspective view, showing a portion of a copying machine in accordance with a fifth embodiment of the present invention.
Figure 22:
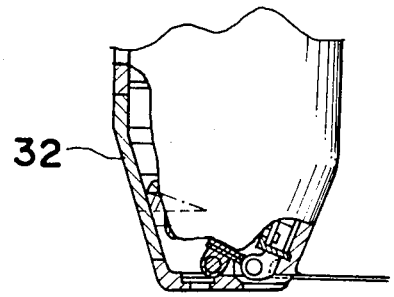
FIG. 22 is a similar view of FIG. 4, showing a copying machine in accordance with a sixth embodiment of the present invention.

Also, by providing the marks 31a and 31b for indicating the range of the reading-out portion of the manuscript 6, during the operation of moving the copying machine parallel to the direction of arrow A as shown in FIG. 20, the operator can clearly visualize and understand the range of the reading-out portion of the copying machine while looking at the outside thereof, and can easily move the copying machine at the right position or orientation parallel to the range 6a of the reading-out portion of the manuscript 6. Although in FIGS. 17 to 19 the marks 31a and 31b are employed to indicate the range and side portion of the manuscript 6, other arrangements can be provided. For example, a cut-out portion or recess provided on the side plane of the copying machine in a shape of understandable design as shown in FIG. 21 may be effective for the operator to recognize the range and side portion of the copying machine from the outside. For the rest, in order to have the same effect as the embodiments of FIGS. 17 to 19, a transparent plate 32 may be provided at a portion of the side plane of the housing so as to be able to see the reading-out portion of the manuscript through the transparent plate 32 from the outside. In addition, in place of the mark 31a indicating the reading-out portion of the manuscript, another mark 31c indicating the width of the copy paper may be provided on the front plane of the copying machine, as shown in FIG. 20, resulting to obtain an effect similar to that of the embodiments of FIGS. 17 to 19.

Figure 23:
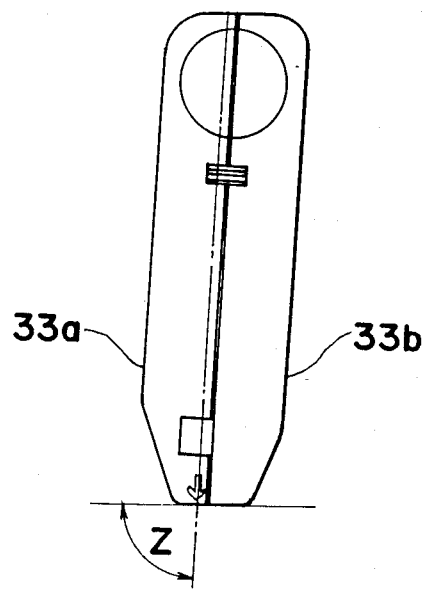
FIG. 23 is a side elevational view, showing a copying machine in accordance with a seventh embodiment of the present invention.
Figure 24:
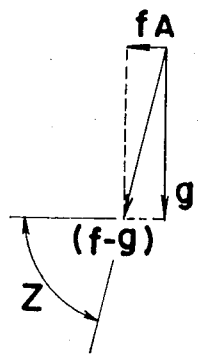
FIG. 24 is a diagram showing a vector of force to be generated by the copying machine of FIG. 23 when in use.
Figure 25:
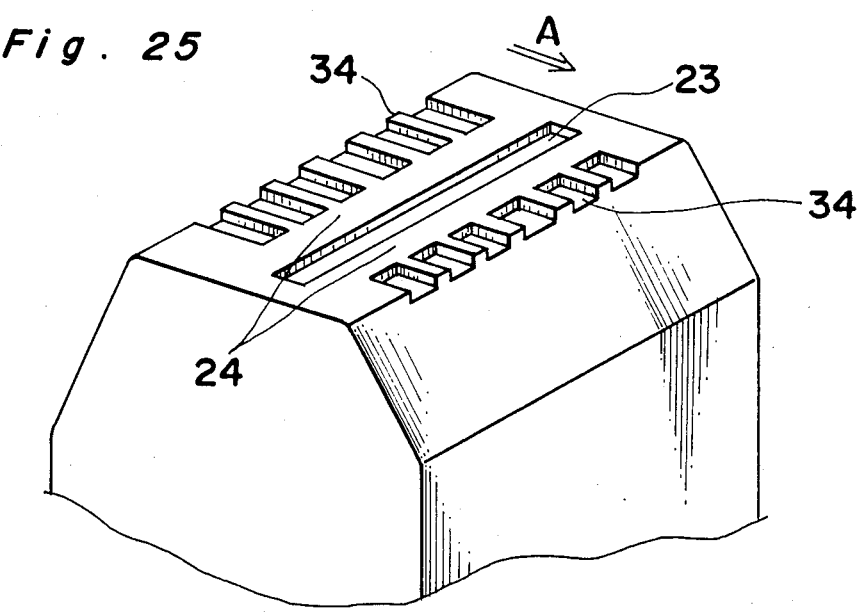
FIG. 25 is a bottom view, on an enlarged scale, showing a portion of a copying machine in accordance with an eighth embodiment of the present invention.

The other characteristic features provided on the bottom plane of the copying machine 5 will be explained in connection with FIG. 23. In FIG. 23, the bottom plane of the copying machine is inclined at a certain angle Z other than a right angle against the center line of the side plane thereof. As shown in FIG. 25, when a force for moving the copying machine in the direction of arrow A is shown with a vector (f-A), and the dead load of the copying machine with a vector (g), the resultant force for these vectors (f-A) and (g) is obtained by a vecotr (f-g) of which direction is inclined at a given angle to the plane of the manuscript 6, and the bottom plane of the copying machine is so designed to incline along the direction of the resultant force that in the movement of the copying machine in the direction of A all forces relating to the copying machine are balanced in view of the directions, whereby the copying machine can be moved smoothly with a small driving force to be applied by the operator. It is a fact that the smaller the force of vector (f-A) for the movement of the copying machine in the direction of arrow A, the easier it is for the operator to operate the copying machine with light force.

For the purpose of moving the copying machine smoothly, on the bottom plane of the copying machine 5, there is provided a plurality of grooves 34 in parallel to the moving direction of the copying machine, as shown in FIG. 25. By providing the grooves 34, the contact area between the manuscript 6 and the bottom plane of the copying machine 5 can be reduced, resulting in that the frictional resistance between them becomes small as well as the force of vector (f-A), and the operation for the copying machine becomes easy for the operator. In addition, the embodiment of FIG. 25 provides a pair of planes 24 at both the forward and rearward sides of the hole 23.

Figure 26:
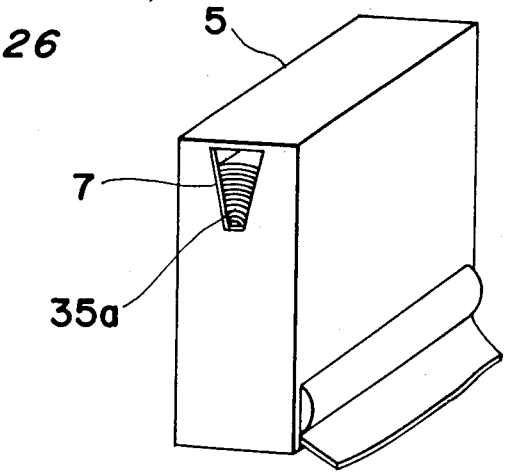
FIG. 26 is a perspective view of a copying machine in accordance with a ninth embodiment of the present invention.

Also, in the embodiments of FIGS. 1 and 3, the housing of the copying machine provides a transparent plate 35 at the side plane thereof through which the interior of the copying machine can be seen from the outside so as to recognize the remaining amount of the copy paper 7 accommodated therein, thereby to warn the operator of trouble such as the non-existence of the copy paper 7 within the copying machine 5. As shown in FIG. 26, in place of the transparent plate 35 of FIGS. 1 and 3, an opening 35a can be provided on the side plane of the housing 10 to see the inside of the copying machine.

Figure 28:
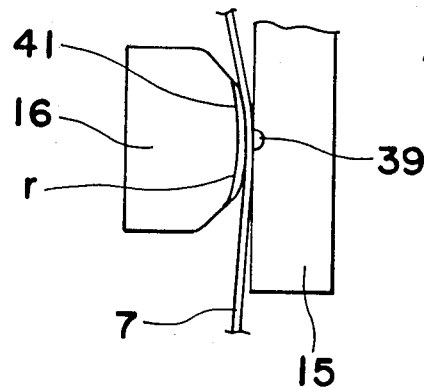
FIG. 28 is an enlarged side view of a thermal head printer to be employed in the copying machine of FIG. 1.

The construction of the thermal head printer 15 will be explained hereinafter in connection with FIG. 28. The thermal head printer 15 is fixedly mounted by bonding agent onto a head base 36 of metal plate, and the charging of electric current to the thermal head printer 15 is made by pressing with pressure a flexible plate 37 consisting of a flexible pattern circuit (hereinafter referred to as an FPC) onto the thermal head printer 15. The one end of the FPC 37 is connected to the thermal head printer 15, and the other end thereof is extended upwardly to connect to the printed circuit board 14a, as shown in FIG. 3. Also, the FPC is pressed against the thermal head printer 15 through a pressing rubber 38, and between the copy paper 7 and the thermal head printer 15 is provided a head cover 15a of metal plate, thereby to prevent the thermal head printer 15 from rubbing against and injuring the copy paper. The passage for transporting the copy paper 7 will be explained later.

Figure 29:
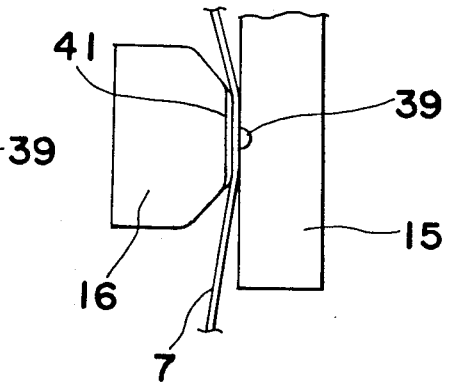
FIG. 29 is an enlarged side view of a thermal head printer to be employed in a copying machine in accordance with a tenth embodiment of the present invention.

Within the thermal head printer 15, there is provided a plurality of memory portions 39 in a line so as to be heated at a high temperature in order to make the memory and copy of characters or graphs of the manuscript onto the copy paper 7. Also, a platen 16 is provided corresponding to the memory portions 39, which is adapted to press the copy paper 7 onto the memory portions 39 by a pair of springs 40, 40. The platen 16, having a shape as shown in FIG. 28, is made of rubber with heat-resistance and proper hardness, and is coated at its surface with fluoric resin of small frictional resistance so as to be able to draw the copy paper 7 to the outside of the copying machine in the direction of B by a small force. In addition, the platen 16 has a trapezoidal cross-section, the top side of which being opposite to the memory portions 39 of the thermal head printer 15 and being formed as a curved plane having a large radius of curvature. FIG. 29 shows a platen 16 having a maximum radius of curvature, i.e., a platen of straight plane.

Figure 30:
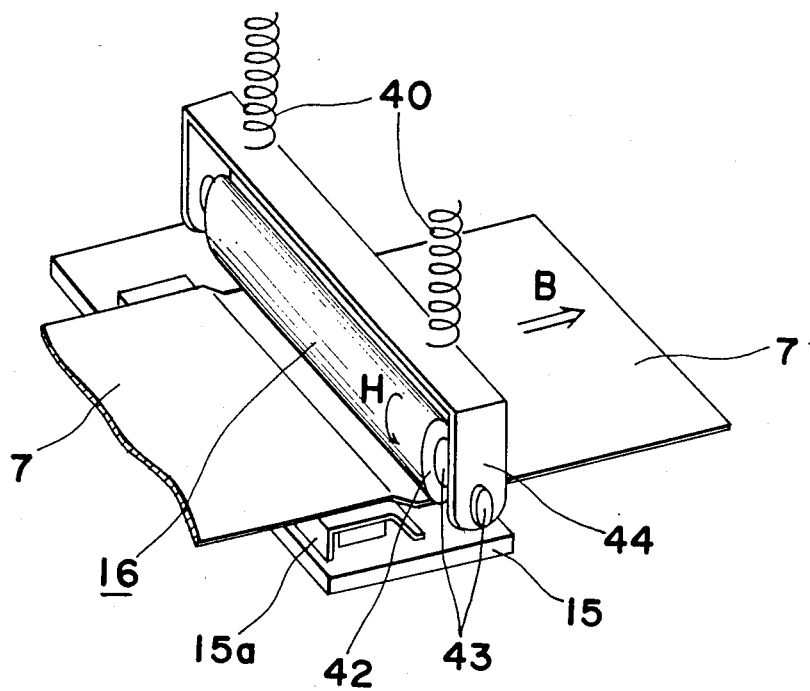
FIG. 30 is a perspective view of an experimental apparatus to be employed in the present invention.

On the other hand, FIG. 30 shows a platen of a cylindrical type which is used in an experiment to analyze the function thereof in comparison with that of the platen 16 of trapezoidal shape in the embodiment of FIG. 28 as follows. In FIG. 30, the platen of a cylindrical type is provided facing the thermal head printer 15 with the copy paper 7 therebetween. The platen 16 is adapted to press the copy paper 7 onto the thermal head printer 15 by means of springs 40, and comprises a cylindrical rubber body 42 and a rotatable metal shaft 43 both ends of which are supported by a pair of bearings 44. If the copy paper 7 is being drawn out by manual operation in the direction of arrow B, the platen 16 is rotated in the direction of arrow H while pressing the copy paper 7 onto the thermal head printer 15. The reasons why the platen of a cylindrical type as shown in FIG. 30 is not employed in the embodiment of the present invention will be explained hereinafter in detail.

The first reason is that it is difficult to form the copying machine 5 in a small size if a platen of a cylindrical type is used. As the copy paper 7 must be pressed sufficiently onto the memory portions 39 in order to provide a good copy on the copy paper 7, the memory portions 39 of the thermal head printer 15 should be arranged parallel to the rotational shaft 43, and should be pressed against the rubber 42 of the platen 16. To satisfy the above two conditions, it is necessary during assembly to maintain a high degree of accuracy between the thermal head printer 15 and the platen 16. But, since the assembly accuracy between them has some limitation in itself, in order to compensate for insufficiency in assembly accuracy, a conventional method for eliminating the above problems would be in such a manner that the contact area between the thermal head printer 15 and the rubber 42 of the platen is increased either by making the radius of the rubber 42 large or by employing the rubber 42 of lower hardness, i.e., using a softer rubber. However, the inventors confirmed by experiments that in order to solve the above problems, it is necessary to provide a rubber of the platen having a radius of more than 10 mm and a hardness of less than 40 degrees, resulting in that it is difficult to provide a copying machine having a small size on the employment of a rubber platen having a radius of more than 10 mm, and the accuracy of the radius of the rubber 42 having a hardness of less than 40 degrees cannot be assured during the mechanical working of the periphery of the rubber 42. On the other hand, in the embodiment of the present invention, satisfactory results are obtained with a platen having a trapezoidal cross-section having an upper side of 4 mm, bottom side of 6 mm and height of 4 mm, thereby to render the copying machine 5 small in size.

The second reason is that it is difficult to secure the assembly accuracy between the thermal head printer and a platen with the employment of the platen of a cylindrical type.

Although, as mentioned above, the platen of a cylindrical type needs a high degree of assembly accuracy between the thermal head printer and the platen, with the employment of the platen have a trapezoidal cross-section according to the embodiments of the present invention, the contact area between the rubber of the platen 16 and the thermal head printer 15 becomes larger due to the use of a platen having a large radius of curvature to thereby facilitate the assembly of the platen 16 and the thermal head printer 15 without the necessity for assembly accuracy therebetween.

The third reason is that the copy paper 7 is often caused to make a zigzag movement in contact with the platen of a cylindrical type and, once the zigzag movement of the copy paper occurs, it cannot be corrected by any means.

Figure 31:
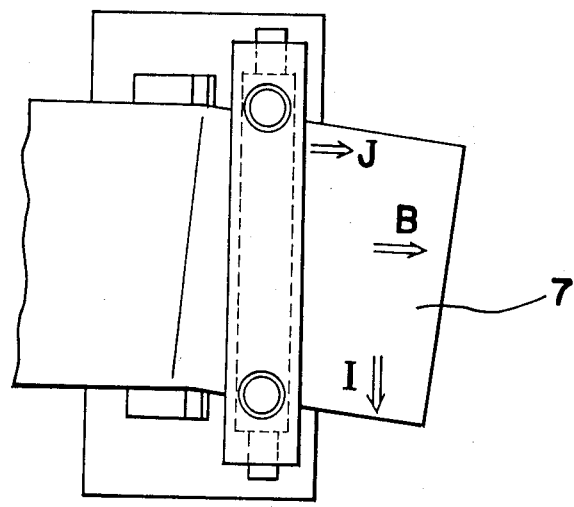
FIG. 31 is a plan view of the apparatus of FIG. 30.
Figure 32:
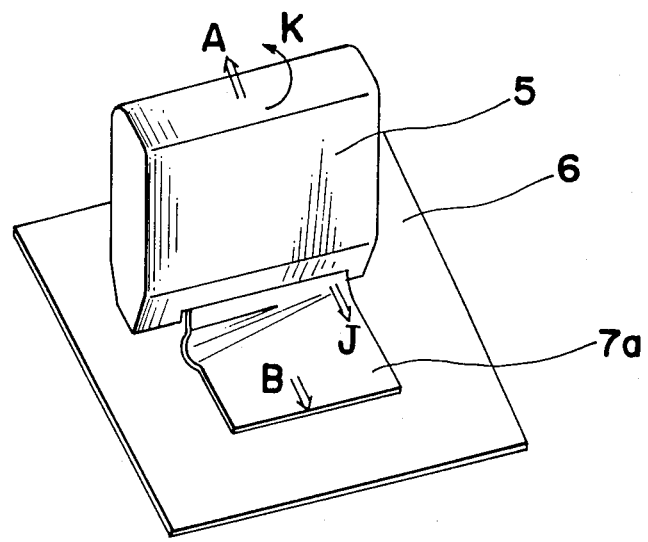
FIGS. 32 to 34 are perspective views each showing the operational state of the copying machine of the present invention, respectively.
Figure 33:
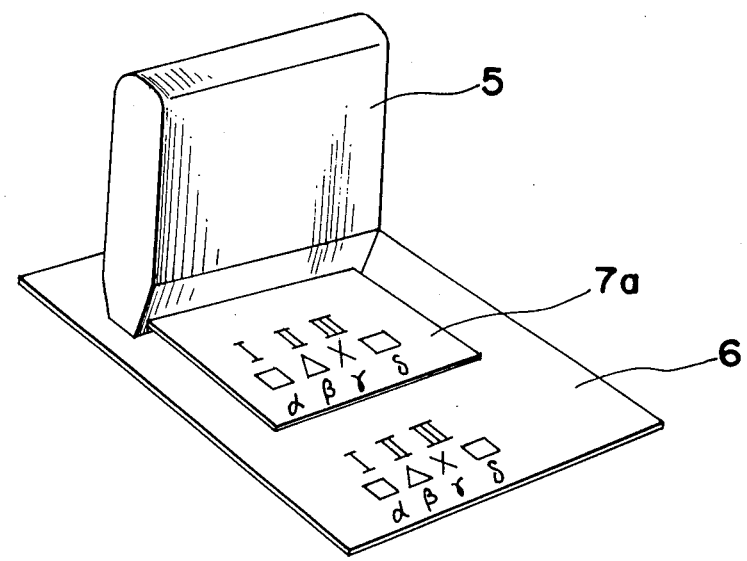
Figure 34:
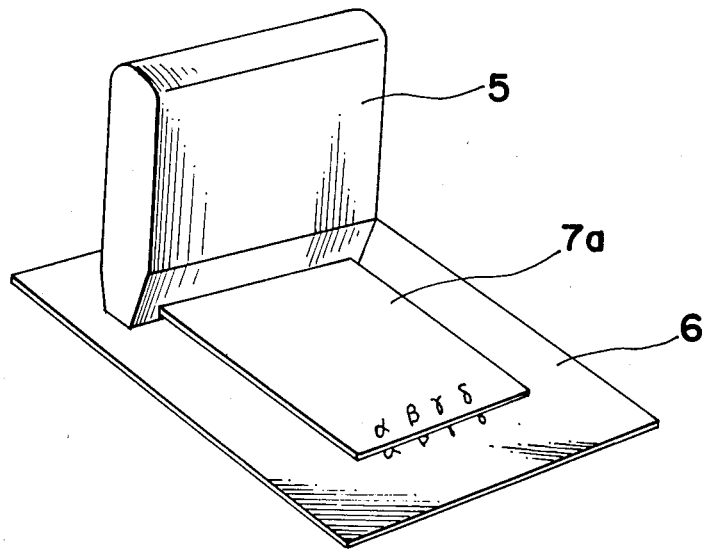

With the employment of the platen of a cylindrical type, the movement in relationship between the copy paper and the thermal head printer during the transportation of the copy paper is a kind of sliding motion, and the movement in relationship between the copy paper and the platen is not sliding motion, but instead is a kind of rolling motion. With these two kinds of motions, if the diameter of the platen varies at either end even by a small amount, the amount of copy paper transferred at both ends of the platen is different, as shown in FIG. 31, which results in a zigzag movement of the copy paper toward the direction of arrow I. Even though the platen is formed in proper dimensions with the same diameter provided at both ends, if there is a difference between the pressing forces of the springs 40 which are pressing both ends of the platen onto the copy paper 7, the rubber of the platen is caused by the pressing forces of the springs 40 to have a difference between the diameters disposed at both ends of the platen, which thereby causes a zigzag movement of the copy paper. In addition, even if the operator attempts to twist the copy machine in the direction of arrow K so as to draw out one end of the copy paper to correct the zigzag movement of the copy paper once it has happened, it is always in vain. This is because sliding motion is not generated between the copy paper and the platen both having a rolling motion therebetween instead. However, in contradistinction thereto, the use of a platen 16 having a trapezoidal cross-section according to the embodiments of the present invention in which both of the relative movements between the copy paper 7 and thermal head printer 15 and the copy paper 7 and platen 16 are a kind of sliding motion, the copying machine 5 of the present invention can be operated without causing zigzag movememt of the copying paper 7 at all, but even if zigzag movement of the copy paper 7 should occur, by drawing out the end J of the copy paper 7 by the operator so as to twist slightly the copying machine 5 toward the direction K, the zigzag movement of the copy paper can automatically be eliminated upon generating sliding motion between the copy paper 7 and the platen 16, as shown in FIG. 33. Also, even when both ends of the platen 16 are receiving different forces by the springs 40, the operator can eliminate the zigzag movement of the copy paper 7 by adjusting the sliding motion between the copy paper 7 and the platen 16 in the same manner as mentioned above.

The fourth reason is that a conventional platen of a cylindrical type is expensive, while the platen having a trapezoidal cross-section according to the embodiment of the present invention can be formed at low cost.

In manufacturing the conventional platen, it is necessary to maintain precise control over the dimensions of the diameter along the entire length thereof but, the configuration of the platen 16 of the embodiment of the present invention is so simple that strict control over the size of the platen is not required, resulting in lowering the cost for the platen 16.

Figure 27:
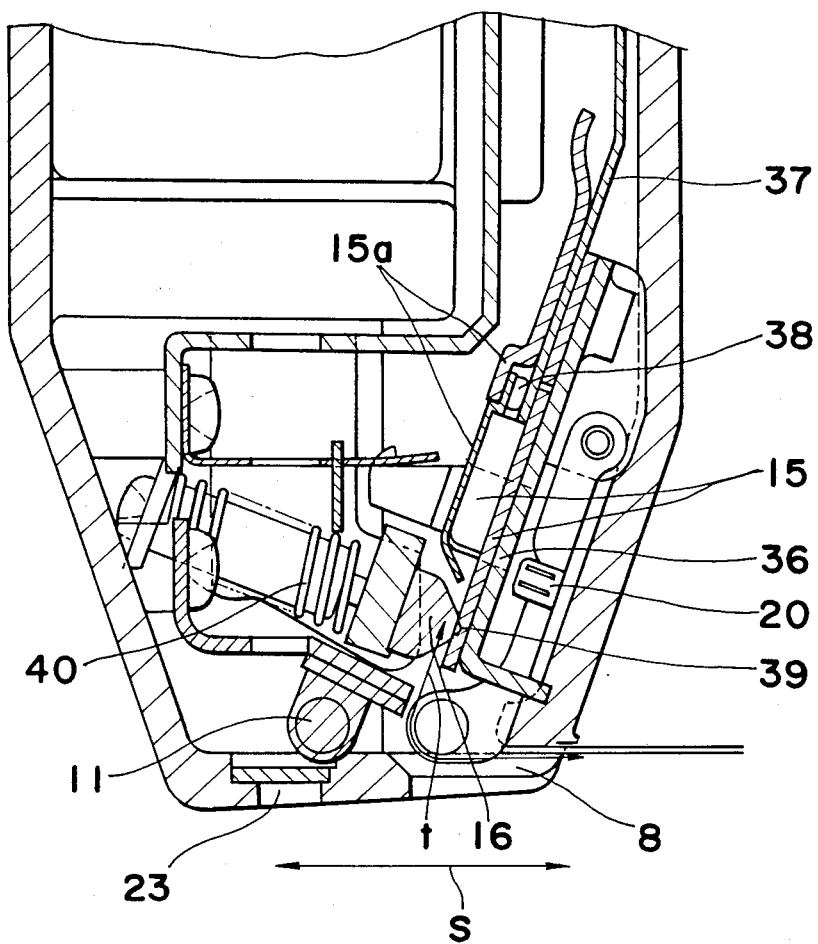
FIG. 27 is a cross-sectional view, on an enlarged scale, showing a portion of the copying machine of FIG. 1.

The relationship of positions between the read-out portion and the memory portion of the copying machine 5 will be explained hereinafter in connection with FIG. 27. In the embodiment of FIG. 27, the copying machine 5 is designed such that a distance s between the exit 8 for the copy paper 7 and the hole 23 of the read-out portion is almost identical to a distance t that the copy paper 7 is transported between the memory portion 39 and the exit 8 of the copy paper 7. With this arrangement, the inconvenience which occurs in the case when these distances are different, i.e., misalignment of the positions between the contents of the manuscript 6 and the contents of the copy paper 7 in the copying operation, can be effectively eliminated. By setting both distances s and t at the same dimensions, characters and graphs of the manuscript 6 can be copied onto the same positions as those of the copy paper 7 having been copied beforehand, whereby the operational feeling of the operator for the copying machine is improved to a large extent. Also, with this arrangement the operator is less likely to think the copying operation of the copying machine is defective due to delay in coping such as, in the case where these distances are different from each other, the appearance of characters or graphs onto the copy paper is sometimes delayed for a certain time immediately after starting the copying operation of the copying machine.

Referring back to FIG. 2, the hole 23 on the bottom plane of the copying machine 5 is provided at a position at the extreme end portion of the bottom plane toward the moving direction of the copying machine 5. This is because it is easy to handle the copying machine 5 for correctly pressing the hole 23 of the housing 10 onto a portion of the manuscript 6 which is desired to be copied, and for precisely moving the copying machine 5 parallel to the direction of arrow A within the range of manuscript 6 under the condition such that the operator can recognize easily the side position of the read-out portion from the outside of the copying machine 5 by the provision of the extreme end portion of the copying machine.

Figure 35:
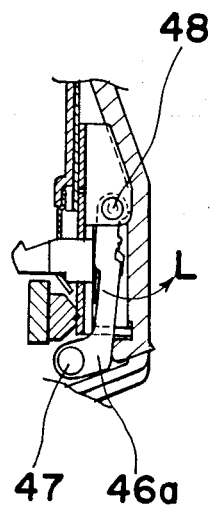
Figure 36:
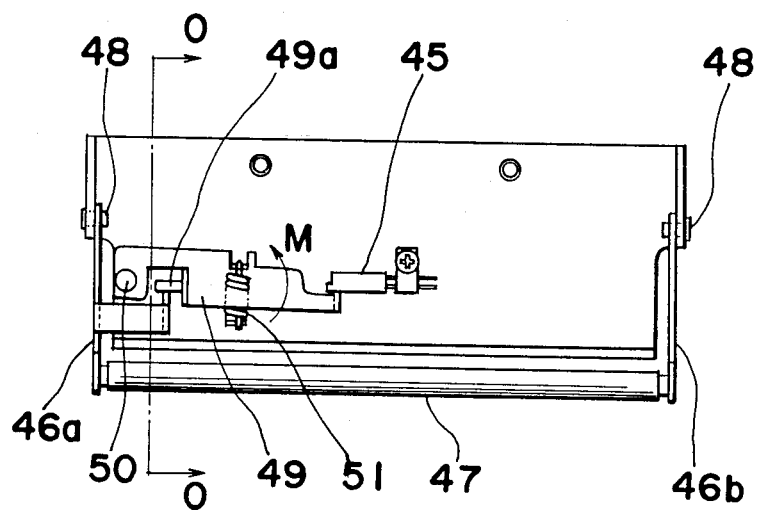
Figure 37:
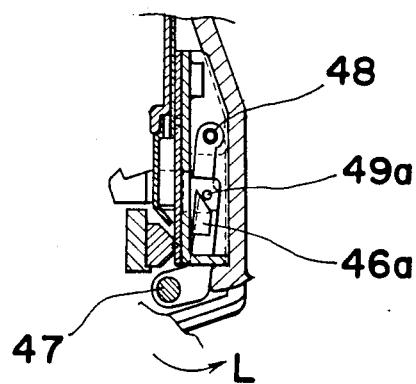

The construction of the paper sensor 20 will be explained hereinafter in connection with FIGS. 35 to 37. Referring to FIGS. 35 to 37, the paper sensor 20 consists of a sensor 45 including a leaf switch, a pair of swing levers 46a and 46b, a tie-rod 47, pivot means 48 for the swing levers 46a and 46b, a sensor plate 49, a pivot means 50 for the sensor plate 49 and a sensor spring 51. The pair of swing levers 46a and 46b are connected with each other via the tie-rod 47, and are respectively mounted rotatably around the pivot means 48 so as to be able to swing toward the direction of arrow L by a tension force which is generated at the time of drawing the starting end of the copy paper 7 to the outside of the copying machine 5. One (46a) of the swing levers has an extension with an inclined surface which is always engaging partially with a pin 49a fixed on the sensor plate 49 as shown in FIGS. 36 and 37, and by swinging the swing lever 46a to the direction L, the sensor plate 49 is rotated around the pivot means 50 of the sensor plate 49 toward the direction M to press up the sensor 45 for closing the circuit of the sensor 45. As shown in FIGS. 38 and 39, the circuit of the sensor 45 is closed upon the swinging movement of the swing levers 46a and 46b toward the direction of arrow L as a result of the tension force of the copy paper generated in the direction of B. Then, if the tension force of the copy paper is diminished, the circuit of the sensor 45 is opened by the return force of the sensor spring 51. As to the function of the paper sensor 45, upon turning on the electric power switch 17 by pressing the operational button 18 by the operator, the light 11 is lit and the circuits provided on the board 14 are actuated, but, at this time, the thermal head printer 15 is still turned off when nothing is copied onto the copy paper 7.

In the copying machine of the embodiment, the thermal head printer 15 is charged to start the copying operation upon closing the circuit of the sensor 45 by the tension force of the copy paper 7 which is drawn outwardly the hole 23 of the housing 10 toward the direction of B. By the way, if a paper sensor is not provided in the copying machine, the machine sometimes happens to have trouble such that at the start of the copying operation an unnecessary black line is copied in the beginning of the copy paper 7 by mistaking the copying operation. The right order for the copying operation of the copying machine comprises the steps of putting the copying machine 5 onto the manuscript 6, securing the starting end of the copy paper 7 onto the manuscript 6 by the hands of the operator, turning on the electric power switch 17 by pressing the operational button 18, and moving the copying machine 5 toward a given direction A to make a copy. However, in the case where a paper sensor is not provided in the copying machine, when the operator turns on the electric power switch 17 and then begins to make a copy while putting the copying machine 5 onto the manuscript 6, the light 11 is turned on and the electric circuit of the copying machine 5 is actuated immediately after closing the electric power source, but the hole 23 of the copying machine 5 is not yet applied to contact with the manuscript 6, resulting in that the light beam emitting from the light 11 is not reflected from the manuscript to the CCD 13 at all. Since the CCD 13 is judging the non-reflecting beam as a black color of the manuscript 6 if the light beam is not reflected onto the CCD 13, the error in data having been read by the CCD 13 immediately after closing the electric power source is transferred in sequence onto the thermal head printer 15, and the black color is copied onto the copy paper 7 even though the copy paper is not transported. Accordingly, at the beginning of the copying operation, it often happens such that an undesirable black line is initially copied onto the copy paper 7. To eliminate such trouble, the paper sensor 45 is provided in the copying machine 5 of the embodiment of the present invention in such a manner that, even if the electric power source is closed before putting the copy paper 7 onto the manuscript 6, the thermal head printer 15 is not charged as long as the sensor 45 is not actuated, resulting in that a black line is not copied onto the copy paper 7.

Figure 41:
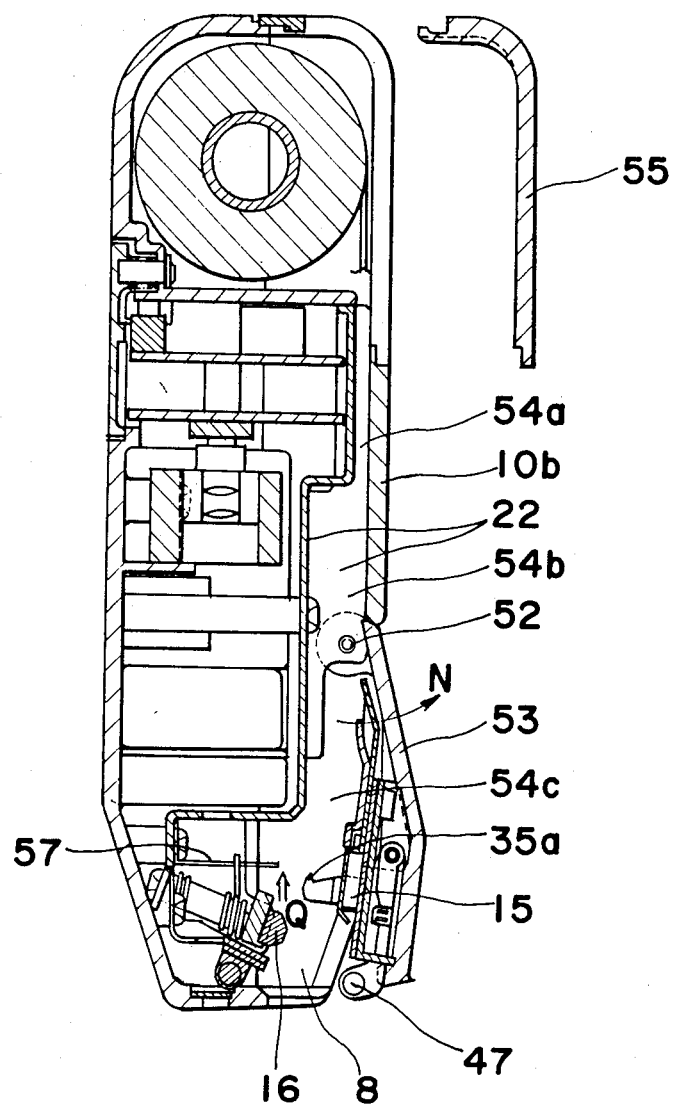
FIG. 41 is a similar view of FIG. 2, showing an opening state of the copying machine of FIG. 1.

The circuit construction of the paper sensor 45 will be mentioned later in connection with the control circuit of the embodiment. Also, the sensor 45 may be provided between the thermal head printer 15 and the roll of the copy paper 7, as shown in FIG. 40. In addition, the storage batteries 19 are connected in series with the printed circuit board 14a and are stored at positions as shown in FIGS. 2 and 3. Also, the paper guide 22 for isolating the copy paper 7 and components such as the storage batteries 19, lens 12 and printed circuit board 14 is provided at a position as shown in FIGS. 2 and 3 so as to guide the copy paper 7. The copy paper 7 can be exchanged upon opening a cover 35 as shown in FIG. 41. In FIG. 41, a bearing 52 is provided at one end of the paper guide 22 which forms a fulcrum for rotating a case cover 53 toward the direction of arrow N. The roll of the copy paper 7 is accommodated within the upper portion of the housing 10, from which the copy paper 7 is drawn out to pass through spaces 54a, 54b and 54c between the case 10b and paper guide 22, is adapted to be copied between the thermal head printer 15 and platen 16, and is taken out from the exit 8 to the outside of the copying machine 5 after passing around the tie-rod 47. The copy paper 7 is inserted into the housing 10 upon opening the cover 55 as shown in FIG. 41, and is set to pass through the passage mentioned above upon opening the case cover 53 in association with the thermal head printer 15. The opening of the thermal head printer 15 in association with the case cover 53 is made by pressing a button 56, as shown in FIG. 3, toward the direction of arrow P to rotate a rock plate 57 toward the direction of arrow Q so as to release a hook 35a provided on the one end of the head base 36 from the rock plate 57. Also, on the printed circuit board 14b, there is provided a connector 58 of the storge batteries 19 for use in charging of the storage batteries 19, and a variable resistor 59 for adjusting a shade of color to be copied on the copy paper 7 in response to the shade of the manuscript 6, as shown in FIG. 3.

Figure 42:
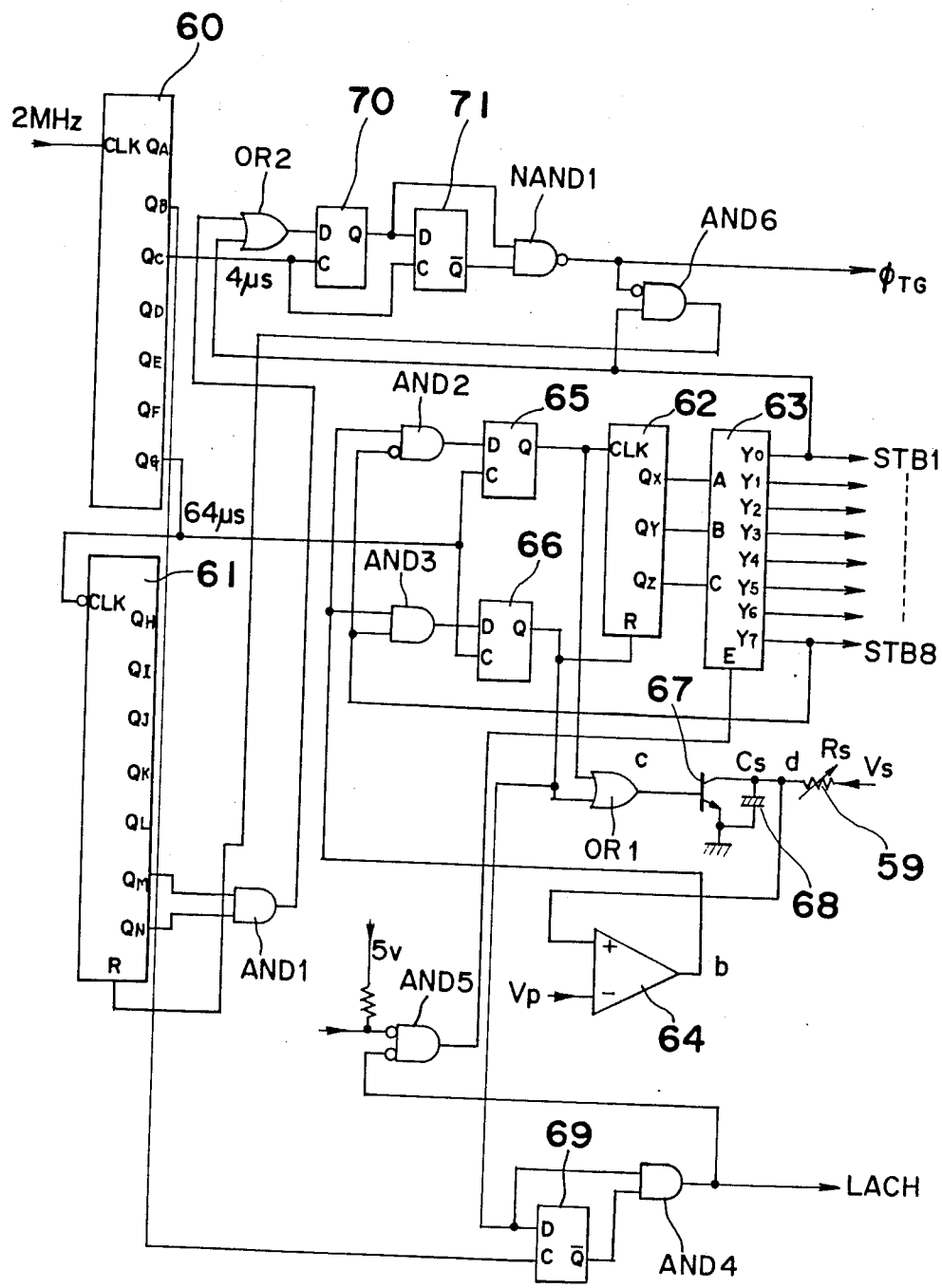
FIG. 42 is an electric circuit block diagram of the copying machine of FIG. 1.

The control circuit for adjusting a shade of color to be copied on the copy paper 7 will be explained hereinafter in connection with FIG. 42. In the electric circuit of FIG. 42, clock pulses of 2 MHz are always inputted into a 7 bit counter 60, from which a train of clock pulses having a period of 64 micro-second is outputted after inputting the seventh bit $Q_G$ of the clock pulses into the 7 bit counter 60. The output of the 7 bit counter 60 is connected to a clock input terminal CLK provided in another 7 bit counter 61 having a reset terminal R, of which the sixth bit output $Q_M$ and seventh bit output terminals $Q_N$ are both connected to input terminals of an AND gate AND1, from which a clock pulse is outputted. The output of a 3 bit counter 62 having a reset terminal R is inputted into a decoder 63, from which eight strobe signals STB1 to STB8 are outputted. The negative input terminal of a comparator 64 is connected with a standard power source $V_P$ (not shown). The output terminal of one D flip-flop 65 is connected with a clock terminal CLK of the 3 bit counter 62 having a reset terminal R, and the output terminal of another D flip-flop 66 is connected with the reset terminal R of the 3 bit counter 62; both output terminals of the D flip-flops 65 and 66 being are connected with a pair of input terminals of an OR gate OR1. The output terminal of the OR gate OR1 is connected with the base of a switching transistor 67, and a capacitor 68 is inserted between the base and emitter of the transistor 67; the collector of transistor 67 is connected with a power source $V_s$ through a variable resistor 59 but and the positive terminal of the comparator 64. Each output terminal of AND gate AND2 and AND3 is respectively connected to D terminals of the D flip-flops 65 and 66. Each of the AND gates AND2 and AND3 has a respective one of the input terminals connected to the output terminal of the comparator 64, and the other input terminal of each of the AND circuit AND2 and AND3 is connected to an output terminal $Y_7$ of the decoder 63 which outputs the strobe signal STB8. The D terminal of another D flip-flop 69 is connected to the output terminal of the D flip-flop 66, while the C terminal of the D flip-flop 69 is connected to the second counter signal $Q_B$ of the 7 bit counter 60. An AND gate AND4 is connected at its one input terminal to the D terminal of the D flip-flop 69, at its other input terminal to the $\bar{Q}$ terminal of the D flip-flop 69, and at its output terminal to the one input terminal of an AND gate AND5. Also, the AND gate AND5 is connected at its other input terminal to the sensor 45 for detecting the existence of the copy paper 7, and at its output terminal to an enable signal input terminal E of the decoder 63. An OR gate OR2 is connected at its one input terminal to the output terminal of the AND gate AND1 for generating clock pulses each having a pulse width of 5.144 micro-seconds; and at its other input terminal to the output terminal $Y_O$ of the first strobe signal STB1 of the decoder 63. The D terminal of D flip-flop 70 is connected to the output terminal of the OR circuit OR2, and each C terminal of D flip-flops 70 and 71 is connected to the third output terminal $Q_C$ of the 7 bit counter 60. Also, the D terminal of the flip-flop 71 is connected to the Q terminal of the D flip-flop 70, and the $\bar{Q}$ terminal thereof to the one input terminal of a NAND gate NAND1. The NAND gate NAND1 is connected at its other input terminal to the Q terminal of the D flip-flop 70, and at its output terminal of an AND gate AND6 to both the negative input terminal and the transporting gate clock output terminal $\phi TG$.

Figure 43:
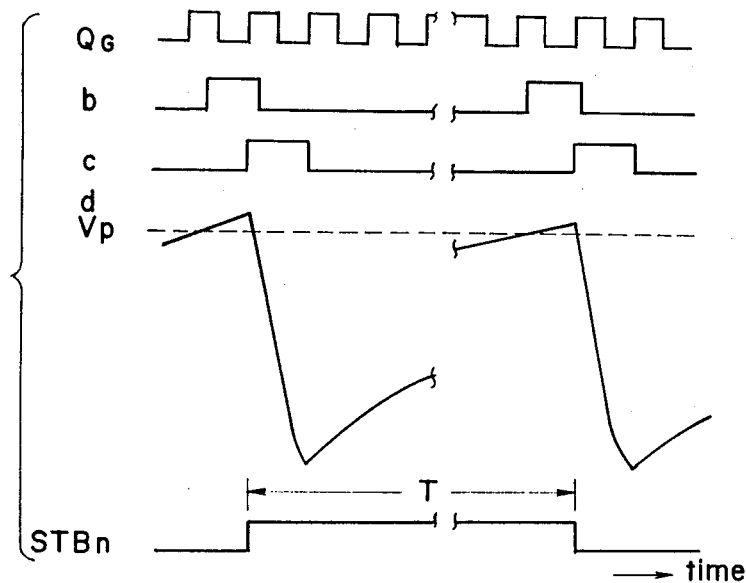
FIGS. 43 to 45 are timing charts of electric signals for the purpose of understanding the operation of the copying machine of FIG. 1.
Figure 44:
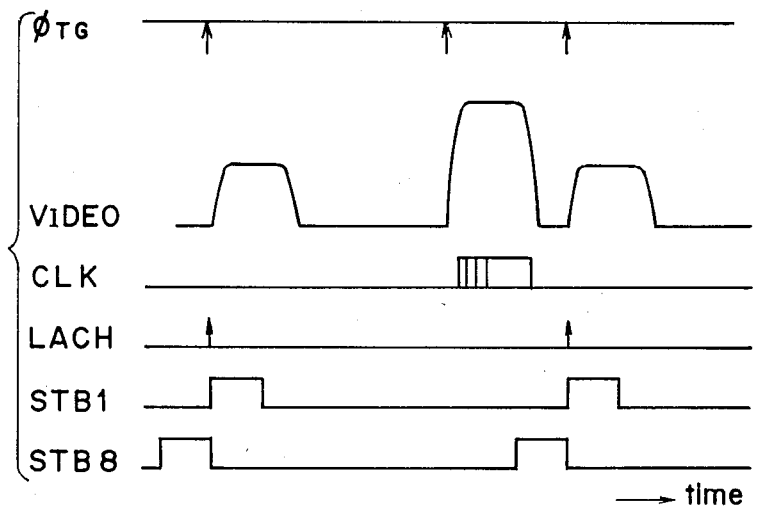

The operation of the control circuit having a construction mentioned above will be explained hereinafter in connection with FIGS. 43 to 45. Referring to FIG. 43, when the capacitor 68 is charged via the variable resistor 58, the voltage at a point d is gradually raised. Then, if the voltage at the point d becomes higher than the $V_P$ of the standard power source, the output of the comparator 64, i.e., the voltage at a point b becomes a high level, and the voltage is applied to the AND gates AND2 and AND3. Here, if the eighth strobe signal STB8 is high, the D terminal of the D flip-flop 66 becomes a high level, and the clock signals having a period of 64 microseconds outputted from the output terminal $Q_g$ of the 7 bit counter 60, are outputted from the Q terminal of the D flip-flop 66 to reset the 3 bit counter 62. At the same time, the transistor 67 is biased through the OR gate OR1, and is turned on for a period of one cycle of the above clock signals to discharge the capacitor 68.

Next, when the voltage of the capacitor 68 is again going up, since the strobe signal STB8 is at a low level, the output of the AND gate AND2 becomes a high level after the output of the comparator 64 becomes a high level, and the clock signals having a period of 64 microseconds are inputted into the clock signal input terminal of the 3 bit counter 62 to output the strobe signal from the decoder 63 after the counting operation of the 3 bit counter 62. At the same time, the transistor 67 is turned on to discharge the capacitor 68, and the width of the strobe signal is regulated by the time that the voltage of the capacitor 68 becomes a given value $V_P$. Accordingly, the width of the strobe signal is set by both the voltage $V_S$ of the power source and the variable resistor 59, and, if the voltage $V_S$ of the power source is lowered, the width of the strobe signal is lengthened to lengthen the printing pulse, whereby the printing quality of the copying machine is maintained constant, and the shade of color for the copy paper can be adjusted by the value of the variable resistor 59. Also, when the 3 bit counter 62 is reset as shown in FIG. 44, the D terminal of the D flip-flop 69 becomes at a high level, and the clock signals of 500 KHz are inputted from the output terminal $\bar{Q}$, whereby the latch signal LACH is outputted from the AND gate AND4 at the time between a pair of the strobe signals STB8 and STB1. Upon receiving both of the signals from the sensor 45 for detecting the copy paper and the latch gate, the AND circuit AND5 outputs an enable signal to the decoder 63.

Figure 45:
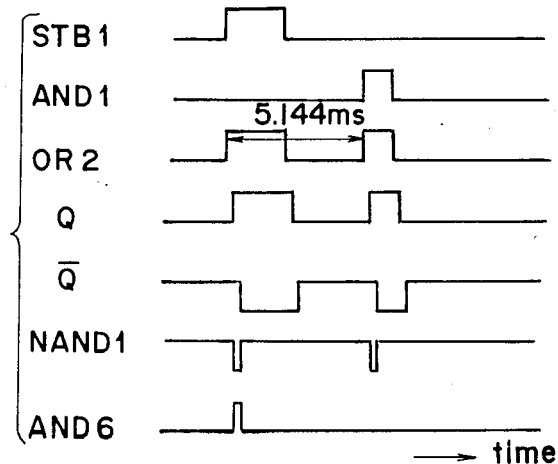

As shown in FIG. 45, the OR gate OR2 receives the strobe signal STB1 and the output of the AND circuit AND1, the raising time of which is delayed for about 5.144 microsecond in comparison with the strobe signal STB1, and generates an output to the D terminal of the D flip-flop 70. At either time of outputting the strobe signal or the signal from the AND gate AND1 delayed for a time of 5.144 microseconds to the strobe signal, the output signal from the output terminal Q of the D flip-flop 70 is adapted to be sampled by the clock signals having a period of 4 microsecond outputted from the output terminal $Q_C$ of the 6 bit counter 60. As the D flip-flop 72 is supplied with clock signals in common with the D flip-flop 70 and the output Q of the D flip-flop 70 is delayed for a shorter time than the input D thereof, the input D of the D flip-flop 71 is sampled by a clock signal next to that sampled the output of the D flip-flop 71. Accordingly, signals of small pulse corresponding to the divergence between the outputs Q and $\bar{Q}$ of the pair of the D flip-flops 70 and 71 are outputted from the NAND gate NAND1, the small pulse signals being employed as a transporting gate clock signal φTG to the CCD 13. Also, as both of the small pulse signals and the strobe signal STB1 are inputted into the AND gate AND6, the AND gate AND6 outputs the strobe signal STB1 of pulse having a short width to reset the 7 bit counter 61.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A copying machine comprising:
   an image sensor of train type having a plurality of sensing cells arranged in a line for detecting image information of a manuscript to be copied;
   an illumination means for illuminating the manuscript to be copied with a beam of light;
   an optical means for introducing the beam of light so as to be focused with the image of the manuscript to be copied on the image sensor;
   a print means for printing image information onto a copy paper in accordance with an output of the image sensor;
   an electric power source for supplying electric power to the image sensor and the print means;
   a housing for accommodating therein the image sensor, the illumination means, the optical means, the print means, the electrical power source, and copy paper; and
   paper guiding means in the housing for guiding the copy paper in contact with the print means and then out of the housing in overlapping relationship with the manuscript to be copied during a copying operation, the paper guiding means comprising an opening adjacent a portion of the housing which confronts the manuscript during the copying operation so that the copy paper can be withdrawn from the housing by fixing a portion of the copy paper in contact with the manuscript with one hand of a user of the copying machine and moving the housing relative to the manuscript with the other hand of the user to thereby apply image information to the copy paper with the print means as the copy paper is withdrawn from the housing.

2. The copying machine of claim 1, wherein the housing includes a reading slit for passage of the image information from the manuscript to the image sensor, the opening being spaced from the print means by a distance equal to the distance between the opening and the reading slit.

3. The copying machine of claim 1, wherein the housing is thinner in cross section taken in a plane which is parallel to the surface of the manuscript at the portion thereof which confronts the manuscript than at the rest of said housing.

4. The copying machine of claim 1, wherein a panel of the housing extends from the portion of the housing which confronts the manuscript and forms an angle therewith, the panel having the opening therethrough for passage of the copy paper outwardly of the housing.

5. The copying machine of claim 1, wherein the housing includes markings on at least one side thereof for indicating the width of the image information sensed by the image sensor.

6. The copying machine of claim 1, further comprising a sensor for detecting the copy paper when the copy paper is being discharged out of the opening of the housing.

7. The copying machine of claim 1, wherein the housing is provided with a window for viewing the copy paper accommodated in the housing.

8. A copying machine comprising:
   an image sensor of train type having a plurality of sensing cells arranged in a line for detecting image information of a manuscript to be copied;
   an illumination means for illuminating the manuscript to be copied with a beam of light;
   an optical means for introducing the beam of light so as to be focused with the image of the manuscript to be copied on the image sensor;
   a thermal head printing means for train type having a plurality of thermal printing cells arranged in a line for thermal-printing image information onto a thermal sheet of copy paper in accordance with an output of the image sensor;
   an electric power source for supplying electric power to the image sensor and thermal head printing means;
   a housing for accommodating therein the image sensor, the illumination means, the optical means, the thermal head printing means, the electric power source and a thermal sheet of copy paper to be printed on by the thermal head printing means; and
   paper guiding means in the housing for guiding the copy paper in contact with the thermal head printing means and then out of the housing in overlapping relationship with the manuscript to be copied during a copying operation, the paper guiding means comprising an opening adjacent a portion of the housing which confronts the manuscript during the copying operation so that the copy paper can be withdrawn from the housing by fixing a portion of the copy paper in contact with the manuscript with one hand of a user of the copying machine and moving the housing relative to the manuscript with the other hand of the user to thereby apply image information to the copy paper with the thermal head printing means as the copy paper is withdrawn from the housing.

9. The copying machine of claim 8, wherein a panel of the housing extends from the portion of the housing which confronts the manuscript and forms an angle therewith, the panel having the opening therethrough for passage of the copy paper outwardly of the housing.

10. The copying machine of claim 8, wherein the housing includes markings on at least one side thereof for indicating the width of the image information sensed by the image sensor.

11. A copying machine comprising:
    an image sensor of train type having a plurality of sensing cells arranged in a line for detecting image information of a manuscript to be copied;
    an illumination means for illuminating the manuscript to be copied with a beam of light;
    an optical means for introducing the beam of light so as to be focused with the image of the manuscript to be copied on the image sensor;
    a thermal head printing means of train type having a plurality of thermal printing cells arranged in a line for thermal-printing image information onto a sheet of copy paper in accordance with an output of the image sensor;

an electric power source for supplying electric power to the image sensor and the thermal head printing means;

a pressing means having a surface made of materials with a low coefficient of friction for pressing the thermal sheet of copy paper onto the thermal head printing means;

a housing for accommodating therein the image sensor, the illumination means, the optical means, the thermal head printing means, the electric power source, the pressing means, and a thermal sheet of copy paper to be printed on by the thermal head printing means; and paper guiding means in the housing for guiding the copy paper in contact with the thermal head printing means and then out of the housing in overlapping relationship with the manuscript to be copied during a copying operation, the paper guiding means comprising an opening adjacent a portion of the housing which confronts the manuscript during the copying operation so that the copy paper can be withdrawn from the housing by fixing a portion of the copy paper in contact with the manuscript with one hand of a user of the copying machine and moving the housing relative to the manuscript with the other hand of the user to thereby apply image information to the copy paper with the thermal head printing means as the copy paper is withdrawn from the housing.

12. The copying machine of claim 11, wherein a panel of the housing extends from the portion of the housing which confronts the manuscript and forms an angle therewith, the panel having the opening therethrough for passage of the copy paper outwardly of the housing.

13. The copying machine of claim 11, wherein the housing includes markings on at least one side thereof for indicating the width of the image information sensed by the image sensor.

14. A copying machine comprising:
an image sensor of train type having a plurality of sensing cells arranged in a line for detecting image information of a manuscript to be copied;
an illumination means for illuminating the manuscript to be copied with a beam of light;
an optical means for introducing the beam of light so as to be focused with the image of the manuscript to be copied on the image sensor;
a print means for printing image information onto a copy paper in accordance with an output of the image sensor;
an electric power source for supplying electric power to the image sensor and print means;
a housing for accommodating therein the image sensor, the illumination means, the optical means, the print means and copy paper;
paper guiding means in the housing for guiding the copy paper in contact with the print means and then out of the housing in overlapping relationship with the manuscript to be copied during a copying operation, the paper guiding means comprising an opening adjacent a portion of the housing which confronts the manuscript during the copying operation so that the copy paper can be withdrawn from the housing by fixing a portion of the copy paper in contact with the manuscript with one hand of a user of the copying machine and moving the housing relative to the manuscript with the other hand of the user to thereby apply image information to the copy paper with the print means as the copy paper is withdrawn from the housing; and
a control circuit connected to the print means and the electric power source including means for adjusting a shade of color to be printed onto the copy paper by the print means in response to the voltage of the electric power source.

15. The copying machine of claim 14, wherein the control circuit includes means for lengthening the width of respective printing pulses to be transferred into each of the printing cells when the voltage of the electric power source is lowered.

16. The copying machine of claim 14, wherein the print means comprises a thermal print means and the copy paper comprises thermal copy paper.

17. The copying machine of claim 6, wherein said sensor detects movement of the copy paper outwardly of the housing and prevents the print means from printing on the copy paper when the copy paper is not moving outwardly of the housing.

18. The copying machine of claim 8, further including means for sensing movement of the copy paper outwardly of the housing and for preventing the print means from printing on the copy paper when the copy paper is not moving outwardly of the housing.

19. The copying machine of claim 11, further including means for sensing movement of the copy paper outwardly of the housing and for preventing the print means from printing on the copy paper when the copy paper is not moving outwardly of the housing.

20. The copying machine of claim 14, further including means for sensing movement of the copy paper outwardly of the housing and for preventing the print means from printing on the copy paper when the copy paper is not moving outwardly of the housing.

* * * * *